United States Patent [19]

Hofmann

[11] Patent Number: 4,594,911

[45] Date of Patent: Jun. 17, 1986

[54] GEAR HOUSING

[75] Inventor: Edwin Hofmann, Bad Oldesloe, Fed. Rep. of Germany

[73] Assignee: Getriebelbau-Nord Schlicht & Kuchenmeiser GmbH & Co, Bargteheide, Fed. Rep. of Germany

[21] Appl. No.: 774,382

[22] Filed: Sep. 9, 1985

Related U.S. Application Data

[63] Continuation of Ser. No. 649,543, Sep. 11, 1984, abandoned, which is a continuation-in-part of Ser. No. 382,089, May 26, 1982, abandoned.

[51] Int. Cl.⁴ ............................................. F16H 57/02
[52] U.S. Cl. .................................................. 74/606 R
[58] Field of Search ...................................... 74/606 R

[56] References Cited

U.S. PATENT DOCUMENTS 3,001,409  9/1961  Von Fumetti ................ 74/606 R X
3,217,556  11/1965  Conover ....................... 74/606 R X

FOREIGN PATENT DOCUMENTS 591653   1/1934  Fed. Rep. of Germany .
879943   6/1953  Fed. Rep. of Germany .
1032635  6/1958  Fed. Rep. of Germany .

Primary Examiner—James A. Leppink
Assistant Examiner—Frank McKenzie
Attorney, Agent, or Firm—Handal & Morofsky

[57] ABSTRACT

A gear housing having an assembly orifice closed by a cover supporting a cover shaft extending centrally into the housing and supporting a pinion in the housing. A gear shaft having mounted thereon a gear wheel interacting with said pinion is journalled in the housing with one of its bearings being positioned between the gear wheel and the cover. Locating devices comprising a surface of revolution concentric to the bearing is provided for securing the exact position of the housing and the cover relative to one another which is necessary for a proper interaction between the gear wheel and the pinion.

4 Claims, 1 Drawing Figure

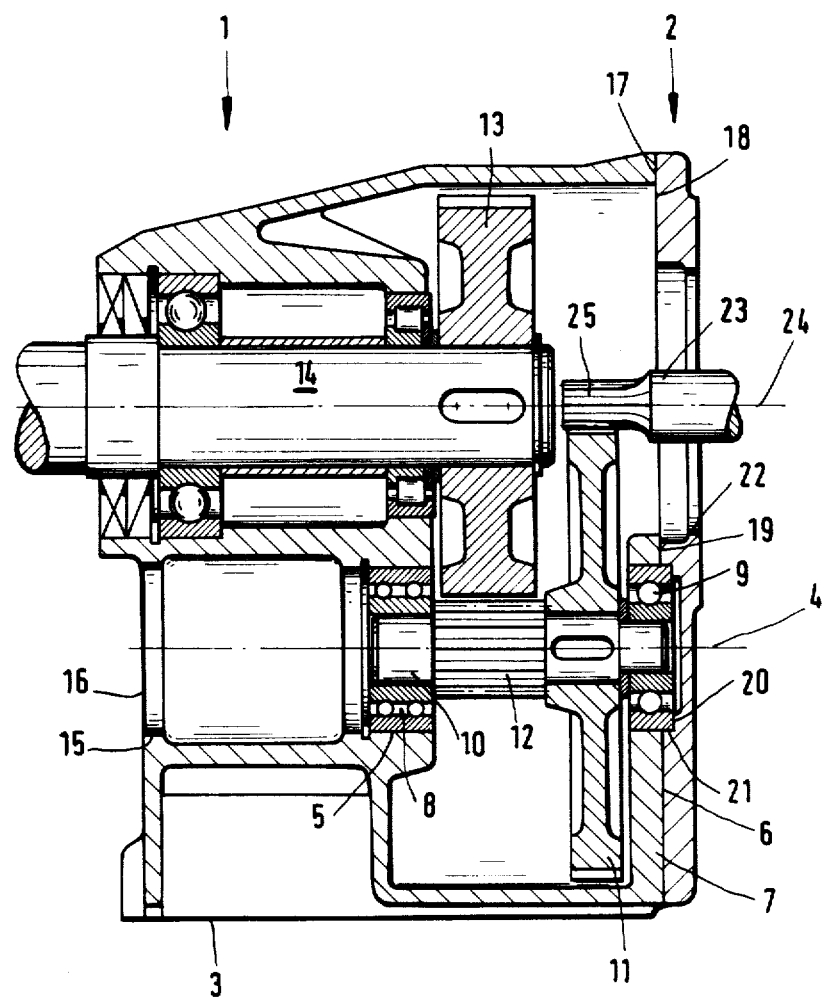

GEAR HOUSING

BACKGROUND OF THE INVENTION

This application is a continuation of application Ser. No. 649,543, filed Sept. 11, 1984, now abandoned, which is a continuation in part of U.S. patent application Ser. No. 382,089 filed May 26, 1982 now abandoned and entitled GEAR which is a conventional patent application based on an application No. P 31 26 688.6 filed in the Federal Republic of Germany on July 7, 1981.

This invention relates to a gear housing having an assembly orifice wherein the housing employs a surface of revolution concentric to a gear shaft bearing in the housing for securing the exact distance between a shaft mounted on the assembly orifice cover and a shaft of a gear in the housing in a simple and economical manner.

More particularly, this invention relates to a gear housing employing an assembly orifice closed by a suitable cover. A gear shaft is journalled within the housing and supports a gear wheel with one of its bearings being positioned on the gear housing between the gear wheel and the housing cover. The cover is provided with a centrally mounted shaft that projects into the housing and supports a pinion which interacts with the gear wheel. Locating devices are provided on the housing for securing the exact portion of the housing relative to the housing cover.

DESCRIPTION OF THE PRIOR ART

German Patent Specification No. 879,943 discloses a gear housing employing a flange motor on the cover side of the housing, the shaft pinion of which interacts with a gear wheel within the housing. The flange motor is centered relative to the cover of the housing by a locating surface concentric to its shaft. As a result, the bearing bore provided for the gear wheel shaft in the housing cover is aligned exactly with the corresponding bearing bore in the housing box. This is achieved by providing the cover and the housing with interacting locating surfaces and with locating pins fixing the angular position.

Accordingly, apart from the locating surfaces and the bearing bores provided for centering the motor on the housing cover, a locating surface on the housing and on its cover, respectively, together with locating bores and locating pins are necessary for assembly purposes. Further, the locating surfaces on the cover and the housing must be adjusted to the position of the bearing bores in a dimensionally accurate manner. This is expensive.

The German Auslegeschrift No. 1,032,635 discloses a gear in which the gear wheel shaft is overhung in the housing requiring that the shaft bearings have greater dimensions than other designs because of their unfavorable position.

German Patent Specification No. 591,653 discloses a gear in which the bearing of the gear wheel shaft on the same side as the cover is not arranged in the cover, but in a special housing projection. Although this does away with the need for the aligned position of the two shaft bearings to depend on the centering of the cover relative to the housing box, nevertheless, careful centering of these two parts relative to one another is necessary because meshing accuracy of the gear and pinion depends on this arrangement.

U.S. Pat. No. 3,001,409 discloses a power take-off employing a housing having a gear wheel and shaft mounted therein. The walls of the housing form a one-piece bearing block for a pair of bearings. A race of bearings is fitted partially in the wall of the housing and a cover therefor to form a locating device.

U.S. Pat. No. 3,217,556 discloses an attachment for a drill press for effecting a transfer of power from an input to a torque applying spindle by means of a speed reducer. There is no mating coaction between parts of the cover and a housing of this attachment.

SUMMARY OF THE INVENTION

In accordance with the invention claimed, a new and improved gear housing is provided that employs interacting locating surfaces on the cover of an access opening therein and on the housing positioned in an off center relationship to a shaft mounted on the cover so that by rotating the cover relative to the housing the distance between this shaft and the gear wheel shaft interacting therewith can be changed and the meshing of the gear wheel with an associated pinion on the cover mounted shaft can be adjusted. Because of this arrangement, it is unnecessary to adjust these locating surfaces in a dimensionally accurate manner to position the bearing bores of the gear wheel shaft and the cover shaft.

The solution according to the invention claimed is that the locating devices are formed by surfaces of revolution concentric to a bearing for the gear.

Appropriately, a bearing block is connected in one piece to the gear housing for providing a bearing on the gear wheel shaft.

The locating surface on the same side of the housing as the bearing is designed as a surface of revolution. This locating surface is appropriately formed by a surface which contributes functionally to the formation of the bearing itself, because it already fits accurately and involves no additional outlay in machining time for its formation. For example, the outer surface of a ball-bearing race or a bore having a bearing race can be used for these purposes. Correspondingly, there is provided on the cover of the access opening a bore surrounding the bearing race or respectively a projection engaging into the bore.

A simplification brought about by means of the invention claimed is based on the fact that the locating surfaces on the housing, which are required for centering the cover relative to the housing box, are obtained automatically when the bearing bores are made, and on the fact that fixing the cover in an angular position relative to the housing becomes completely superfluous. This is because, by using locating surfaces concentric to the bearing bore of the housing, the distance between the shafts is fixed completely and can no longer be influenced by a change in the angular position of the cover relative to the housing.

It is, therefore, one object of this invention to provide a new and improved gear housing in which the meshing of a gear wheel and an associated pinion of a housing cover mounted shaft may be aligned without complicated adjustments susceptible to faults.

Another object of this invention is to provide a new and improved gear housing employing an adjustment means between a gear wheel and a cover mounted shaft the pinion of which is in meshing engagement with the gear wheel which can be accomplished simply and efficiently under production conditions.

A further object of this invention is to provide an adjustment means for aligning the teeth of a gear wheel with those of an associated pinion of a cover mounted shaft which comprises surfaces of revolution concentric to bearing of the gear wheel.

A still further object of this invention is to provide a new and improved gear housing employing a one-piece bearing block mounted on the housing.

Further objects and advantages of this invention will become apparent as the following description proceeds and the features of novelty will be pointed out in the claims annexed to and forming a part of this specification.

BRIEF DESCRIPTION OF THE DRAWING

The invention is explained in more detail below with reference to the drawing which shows in a single FIGURE a vertical longitudinal section through the gear.

DESCRIPTION OF THE PREFERRED EMBODIMENT

Referring more particularly to the drawing by characters of reference, the FIGURE shown illustrates a gear box or housing 1 closed at its right side by a cover 2. The gear housing has a base 3 for fastening to a suitable surface by anchoring devices (not shown).

The housing is designed to support a gear shaft along an axis 4 within a bearing bore 5 remotely positioned in housing 1 from its cover 2 and a bearing bore 6 on the same side of the housing as cover 2, formed in part 7 of the wall of housing 1. This wall portion of housing 1 is hereinafter referred to a bearing block although this expression is not intended to contain any restrictive connotation with regard to the invention claimed. Bores 5 and 6 can be made on one and the same machine without rechucking the work piece, thus assuring that both bores will be axially aligned.

Roller bearings 8 and 9 are located in bearing bores 5 and 6, respectively, for mounting therein a gear shaft 10 which shaft supports on the same side as the cover, a gear wheel 11 and a pinion 12 which meshes with a gear wheel 13 mounted on a driven shaft 14.

A bore 15 formed in the side of housing 1 facing away from the opening closed by cover 2 provides access to gear shaft 12 after removal of a closure cover 16 and during assembly of the gear housing forms an opening through which the gear may be assembled in housing 1.

The end faces or surfaces 17 of housing 1 and the end face 19 of bearing block 7 on the same side of the housing as cover 2, interact with surface 18 of cover 2 to form a plane sealing surface for cover 2 with housing 1. If desired, the coaction of faces 17 and 19 may occur along a nonplanar arrangement and thus fall within the scope of this invention.

The outer bearing race of roller bearing 9 projects outwardly of the surfaces of end faces 17 and 19 of housing 1 in such a way that the exposed part 20 of its outer periphery forms a locating surface for centering the cover which is provided for this purpose with a suitable bore 21.

Cover 2 further defines a locating bore 22 for centering a flange motor 26, the shaft 23 of which projects along axis 24 as a so-called cover shaft, into gear housing 1 and supports a pinion 25 interacting with gear wheel 11.

The quality of meshing of pinion 25 with gear wheel 11 is determined solely by the distance between the associated axes 4 and 24 and consequently by the center-to-center distance between the locating bores 21 and 22. The angular position of cover 2 relative to the axis of rotation 4 is of no importance for the meshing quality. In this construction, therefore, it is not necessary, in any respect, to fix the position of cover 2 relative to housing 1 exactly by means of locating pins; instead, it is sufficient to center cover 2 relative to the axis of rotation 4. This centering is achieved in the simplest way by means of bore 21 of cover 2 interacting with the outer race of bearing 9. Moreover, as a result of the arrangement of bearing 9 in bearing block 7 arranged in housing 1, the quality of mounting of shaft 10 becomes independent of the position of cover 2.

While it will be apparent that the preferred embodiments of the invention disclosed are well calculated to fulfill the objects stated, it will be appreciated that the invention is susceptible to modification, variation and change without departing from the proper scope or fair meaning of the invention.

What is claimed is:

1. A gear assembly comprising:
    a housing having an assembly orifice,
    a cover for closing said orifice,
    a gear shaft journalled in said housing,
    a gear wheel mounted on said gear shaft for rotation therewith,
    a first bearing for said gear shaft located in said housing at one end of said gear shaft between said gear wheel and said cover,
    a second bearing for said gear shaft located in said housing at the other end of said gear shaft,
    said cover having a first bore extending therethrough,
    a cover shaft of a motor mounted to said cover substantially centered in relationship to said first bore in said cover and arranged to project therethrough into said housing,
    a pinion supported by said cover shaft and positioned in said housing for interacting with said gear wheel, and
    locating means for securing the exact distance between said gear shaft and said cover shaft,
    said locating means comprising a pair of surfaces of revolution concentric to said first bearing which axially align with said first bearing when said cover is mounted on said housing and covering said assembly orifice,
    said pair of surfaces of revolution comprising a periphery of said first bearing and a mating surface, said mating surface mating with said periphery and formed in said cover.

2. The gear assembly set forth in claim 1 wherein:
    said housing comprises a bearing block adjacent said assembly orifice for supporting said first bearing.

3. The gear assembly set forth in claim 2 wherein:
    said first bearing extends outwardly of said bearing block.

4. The gear assembly set forth in claim 4 wherein:
    said bearing block comprises an outer wall of said housing, and
    said outer wall defines a bore for receiving and supporting therein said first bearing.

* * * * *